(12) United States Patent
Oleinik et al.

(10) Patent No.: US 9,098,216 B2
(45) Date of Patent: Aug. 4, 2015

(54) PRINTER FUNCTIONALITY ENABLEMENT

(75) Inventors: John H Oleinik, Camas, WA (US); Shiyun Yie, Camas, WA (US); Andrew J Binder, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 205 days.

(21) Appl. No.: 13/455,165

(22) Filed: Apr. 25, 2012

(65) Prior Publication Data

US 2013/0286428 A1   Oct. 31, 2013

(51) Int. Cl.
 *G06F 3/12* (2006.01)
 *H04N 1/00* (2006.01)

(52) U.S. Cl.
 CPC ............ *G06F 3/1204* (2013.01); *G06F 3/1239* (2013.01); *G06F 3/1285* (2013.01); *H04N 1/00233* (2013.01); *H04N 1/00344* (2013.01); *H04N 1/00925* (2013.01); *H04N 1/00973* (2013.01); *H04N 2201/0082* (2013.01)

(58) Field of Classification Search
 USPC ................................................ 358/1.13–1.18
 See application file for complete search history.

(56) References Cited

U.S. PATENT DOCUMENTS

| 4,829,326 A | 5/1989 | Emmett et al. |
| 5,049,898 A | 9/1991 | Arthur et al. |
| 5,835,817 A | 11/1998 | Bullock et al. |
| 5,837,986 A | 11/1998 | Barile et al. |
| 5,930,553 A | 7/1999 | Hirst et al. |
| 6,008,827 A | 12/1999 | Fotland |
| 6,155,664 A | 12/2000 | Cook |
| 6,351,317 B1 | 2/2002 | Sasaki et al. |
| 6,467,888 B2 | 10/2002 | Wheeler et al. |
| 6,522,348 B1 | 2/2003 | Brot et al. |
| 7,221,473 B2 | 5/2007 | Jeran et al. |
| 7,248,693 B1 | 7/2007 | Tretter et al. |
| 7,356,279 B2 | 4/2008 | Miller et al. |
| 7,551,859 B2 | 6/2009 | Miller et al. |
| 2002/0194064 A1 | 12/2002 | Parry et al. |
| 2003/0053815 A1* | 3/2003 | Testardi et al. ................ 399/79 |
| 2003/0055876 A1 | 3/2003 | Korala et al. |

(Continued)

FOREIGN PATENT DOCUMENTS

| DE | 10042914 | 4/2001 |
| EP | 1070594 | 1/2001 |

(Continued)

OTHER PUBLICATIONS

LexMark; "Lexmark's Cloud-Based Print Release Solution Enables Mobile Printing from Anywhere"; Aug. 11, 2011; 2 pages.

(Continued)

*Primary Examiner* — Marivelisse Santiago Cordero
*Assistant Examiner* — Kevin Ky
(74) *Attorney, Agent, or Firm* — Hewlet-Packard Patent Department

(57) ABSTRACT

In one embodiment, enablement data, indicative of an enablement state of a functionality at a network-connected printer, is received from the printer. Fulfillment data, indicative of a fulfillment state of a condition to the enablement of the functionality at the printer, is received. It is determined whether the enablement data is consistent with the fulfillment data. Responsive to determining that the enablement data is inconsistent with the fulfillment data, a change instruction is sent to the printer over a network to cause a change in the enablement state to another state that is consistent with the fulfillment data.

20 Claims, 4 Drawing Sheets

(56) References Cited

U.S. PATENT DOCUMENTS

| | | |
|---|---|---|
| 2006/0120735 A1 | 6/2006 | Adkins et al. |
| 2009/0040554 A1* | 2/2009 | Burke et al. ............ 358/1.15 |
| 2010/0073707 A1 | 3/2010 | Ferlitsch |
| 2010/0123911 A1* | 5/2010 | Guay ........................ 358/1.9 |
| 2011/0085196 A1 | 4/2011 | Liu et al. |
| 2012/0218597 A1* | 8/2012 | Hashimoto ............ 358/1.15 |
| 2014/0096782 A1 | 4/2014 | Ampolini et al. |

FOREIGN PATENT DOCUMENTS

| | | |
|---|---|---|
| JP | 05193127 | 8/1993 |
| JP | 09169123 | 6/1997 |
| JP | 2000270129 | 9/2000 |
| KR | 20110127566 A | 11/2011 |
| WO | WO-8801818 | 3/1988 |
| WO | WO-9728001 A1 | 8/1997 |
| WO | WO-0019278 | 4/2000 |
| WO | WO-0161917 | 8/2001 |
| WO | WO-2013022443 A1 | 2/2013 |

OTHER PUBLICATIONS www.papercut.com/tour/; "A quick look at PaperCut"; 6 pages.
Security Features of Lexmark Multi-function and Single Function Printers, (Research Paper), Nov. 2013, found at (continued from above) http://www.lexmark.com/en_CA/solutions/business-solutions/.
Wikipedia, "Netflix," Mar. 30, 2012, <http://en.wikipedia.org/w/index.php?title=Netflix&oldid=484748813>.
Wikipedia, "Subscription business model," Mar. 21, 2012, <http://en.wikipedia.org/w/index.php?title=Subscription_business_model&oldid=483235596>.

* cited by examiner

| Enablement/Fulfillment Association Database ||||||
|---|---|---|---|---|---|
| Functionality | Current Enablement State as Indicated by Functionality Data | Condition to Enablement of Functionality | Fulfillment Status as Indicated by Fulfillment Data | Correct Enablement Status in View of Fulfillment Status | Change? |
| Usage of Color Marking Agent Cartridges | Disabled 320 | Up to Date on Payment of License Fees for Cartridges 314 | Met 316 | Enabled 318 | Yes 322 |
| Usage of All Black And White Marking Agent Cartridges | Enabled 332 | Subscription to a Service that Provides Access to the Printer as Part of the Service 326 | Met 328 | Enabled 330 | No 334 |
| Usage of Scanner | Enabled | Subscription to a Service that Provides Access to the Printer as Part of the Service | Met | Enabled | No |

FIG. 3

PRINTER FUNCTIONALITY ENABLEMENT

BACKGROUND

Some internet-connected printers are capable of sending and receiving communications and printable content via the internet without maintaining a wired or wireless connection to a particular desktop computer, laptop computer, or other host computing device. Such an internet-connected printer provides a user with the flexibility to receive print requests and printable content at the printer from a computing device geographically distant from the printer.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

FIG. 3 depicts an example enablement/fulfillment association database, according to various embodiments.

The same part numbers designate the same or similar parts throughout the figures.

DETAILED DESCRIPTION OF EMBODIMENTS

Figure 1:
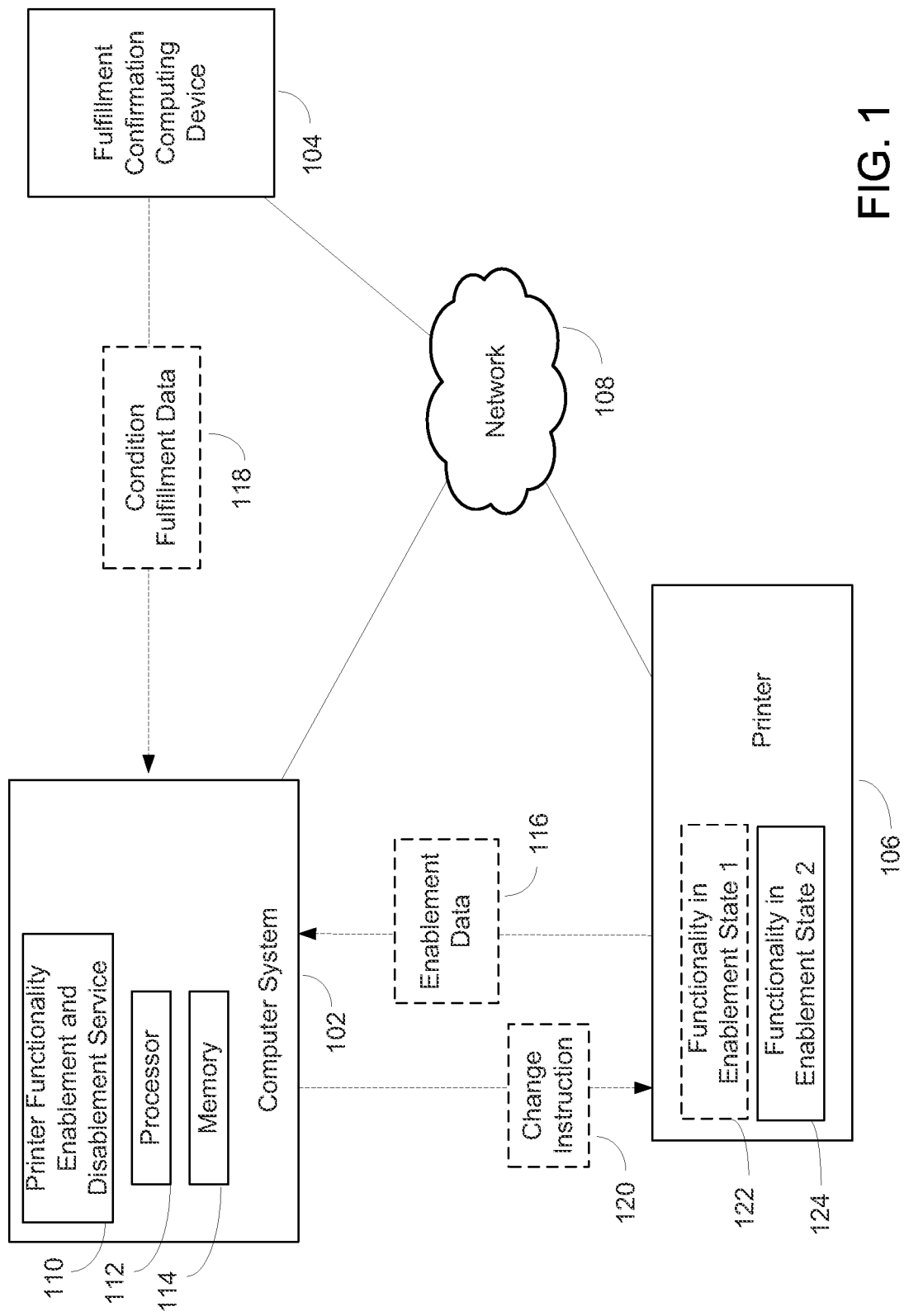
FIG. 1 is a block diagram illustrating a system according to various embodiments.

Today some users of internet-connected and other network-connected printers find it useful to enter into a licensing agreement, subscription agreement, lease or other contract with respect to a printing supply, or even the printer itself. This can be an attractive alternative to outright purchase of the printer supply or printer. In an example, a user may obtain a printer, at a nominal price or gratis, that is bundled with a long-term supply of ink to be licensed or leased from a subscription service. However, printer manufacturers and subscription services face difficulties when a consumer purchases or take delivery of printers at a nominal price or gratis, and then utilizes the accompanying supply of ink without meeting the terms of a subscription or lease that covers the manufacturer or subscription service's costs in providing the ink. Without an ability to grant and revoke permissions with respect to the supply or other printer functionality, the manufacturer or subscription service may not be able to provide the flexible subscription and lease options for printers and printer supplies that consumers will find valuable.

Accordingly, various embodiments described herein were developed to provide an ability to enable and disable printer functionality based upon satisfaction of payment of a license fee, subscription fee, lease payment, or any other defined condition precedent. In an example of the disclosure, a printer that connects directly to the internet can have printer functionality enabled or disabled from an internet accessible service depending satisfaction of the condition precedent. Advantages of the disclosure include that the disclosure makes practical a printing service that enables a user to access or utilize a printing supply or printer for a reduced cost as compared to a cost of purchase, and the user then pays a regular payment for the use of a supply or the printer. Another advantage of the disclosure is that the printer, or a supply at the printer, can enforce compliance with agreements in place between a user and the provider of the subscription or leasing service.

As used in this application, a "printer" or "printing device" refers to any liquid inkjet printer, solid toner-based printer, liquid toner-based printer, or any other electronic device that prints." "Printer" or "printing device" includes any multi-functional electronic device that performs a function such as scanning and/or copying in addition to printing. A "network-connected printer" refers to a printer that is connected to a network, to be capable of obtaining content, sending and receiving messages, accessing network content, and/or accessing applications via a network. In examples, the network may be a proprietary network, a secured network, an open network, an intranet, an extranet, or an internet. An "enablement state" refers to a status of enablement of functionality at a printer at a particular time. A "fulfillment state" refers to a status of fulfillment of a condition at a particular time. "Fulfillment data" refers to data indicative of a fulfillment state. A "marking agent" refers to any substance applied to a media during a printing operation, including but not limited to aqueous inks, solvent inks, UV-curable inks, dye sublimation inks, latex inks, and powders.

FIG. 1 shows a computer system 102 electronically connected to a computing device 104 and a printer 106 via a network 108. Computer system 102 represents generally any computing device or group of computing devices configured to send and receive network requests, send and receive data, and/or otherwise communicate with, computing device 104 and printer 106. In examples, computer system 102 may be or include a server, desktop computer, notebook computer, mobile device, tablet computer, and/or any other computing device. In an example, computer system 102 may be additionally configured to send printable content in electronic form to, and/or receive printable content in electronic form from, printer 102.

Computing device 104 is labeled as a "fulfillment confirmation computing device" and represents generally any computing device or group of computing devices configured to send and receive network requests, send fulfillment data and other data to, and otherwise communicate with, computer system 102.

Printer 106 represents generally a computing device that is operable to produce a printed print job or printed content, and additionally operable to receive network requests, change instructions, and other data from, and to send network requests, enablement data, and other data to, and otherwise communicate with computer system 102 over network 108. In an example, printer 106 may be additionally configured to send receive printable content in electronic form to computer system 102 and other computing devices over network 108.

Network 108 represents generally hardware components and computers interconnected by communications channels that allow sharing of resources and information. Network 108 may include a cable, wireless, fiber optic, or remote connection via a telecommunication link, an infrared link, a radio frequency link, or some combination of these, or any other connectors or systems that provide electronic communication. Network 108 may include, at least in part, an intranet, the internet, or a combination of both. Network 108 may also include intermediate proxies, routers, switches, load balancers, and the like. The paths followed by network 108 between computer system 102, computing device 104, and printer 106 as depicted in FIG. 1 represent the logical communication paths between these devices, not necessarily the physical paths between the devices.

Computer system 102 is shown to include a printer functionality enablement and disablement service 110, a processor 112, and a memory 114. Printer functionality enablement and disablement service 110 represents generally any combination of hardware and programming configured to provide for enablement and disablement of printer functionality based upon fulfillment or lack of fulfillment of a condition precedent to operation of the printer functionality. Processor 112 represents generally any instruction execution system, such as a computer/processor based system or an ASIC (Application Specific Integrated Circuit), a computer, or other system that can fetch or obtain instructions or logic stored in memory 114 and execute the instructions or logic contained therein. Memory 114 represents generally any memory configured to store program instructions and other data.

In the example of FIG. 1, the printer functionality enablement and disablement service 110 executing at computer system 102 receives, from a network-connected printer, enablement data 116 indicative of a first enablement state of functionality 122 at the printer 106. In this example, the first enablement state 122 is an "enabled' state with respect to the functionality. In another example, the enablement data 116 could indicate a first enablement state that is a "disabled' status for the functionality. In another example, the enablement data 116 could indicate a state that is an intermediate state between "enabled" and "disabled", e.g., a "partially enabled" or "partially disabled" state.

In an example, the functionality for which the received enablement data is applicable is use of an ink cartridge, ink tank, toner cartridge, or other marking agent supply within the printer 106. In one example, the functionality is use of a color marking agent supply. In another example, the functionality for which the received enablement data is applicable is use of a color marking agent supply. In another example, the functionality for which the received enablement data is applicable is use of a color photo marking agent supply specialized for printing of photographic images. In another example, the functionality for which the received enablement data is applicable is use of a first marking agent supply within the printer 106 that is the subject of a licensing or subscription agreement, and the printer 106 holds a second marking agent supply that can be utilized by a user or the printer without restriction (as the second supply is not the subject of a license, subscription agreement, lease or other contractual obligation pertaining to use).

In other examples, the functionality for which the received enablement data is applicable is use of a printing component or hardware in the printer other than a marking agent supply, such as use of a printhead, or pen. In other examples, the functionality for which the received enablement data is applicable is use of a component or feature of the printer that is not directly related to printing an image, such use of a scanner component or shredder component that is included within the printer.

Returning to the example of FIG. 1, the printer functionality enablement and disablement service 110 receives from the fulfillment confirmation computing device 104 fulfillment data 118 indicative of a fulfillment state of a condition to the enablement of the functionality at the printer.

In an example, the condition to the enablement of the functionality at the printer 106 is includes payment of a license fee, subscription fee, lease payment, or other charge that is a contractual condition to use of the functionality. In a particular example, a user may take possession of an ink cartridge or other printer supply and enter into a license agreement, subscription agreement, lease, or other contract that authorizes the user to use the supply for a specified period in exchange for a fee or charge. In such case, the fee or charge is the condition to the use of the functionality. In another example, a user may purchase a printer that is bundled with a long-term supply of ink, and the user licenses or leases the ink from an ink subscription service. In this case, user payment of the license fee or lease charge is the condition to the use of the functionality.

In yet another example, a user may purchase or be provided with a printer that is bundled with a supply of ink commensurate with the expected life of the printer, the user pays a monthly or other regular payment for a printing service that gives the user access to the printer. In this case, payment of the monthly or other regular payment is the condition to the use of the functionality. In another example, a user may take possession of a printer and enter into a license agreement, subscription agreement, lease, or other contract that authorizes the user to use the printer itself for a specified period. In this case, user payment of the license fee, subscription fee, or lease payment, or other charge is the condition to the use of the functionality.

In other examples, printer functionality may be enabled or disabled according to fulfillment or nonfulfillment of conditions other than payment of a fee or charge. In an example, certain printer functionality may be enabled or disabled according to a type of print job that is received at the printer, or a type of content that is received for printing at the printer. In these cases, the type of print job or the type of content is the condition to the use of the functionality.

In another example, certain printer functionality may be enabled or disabled according to whether or not a user has subscribed to a service that provides a user with access to the printer as part of a subscription service. In this case, the user subscription to the service is the condition to the use of the functionality. In another example, certain printer functionality may be enabled or disabled according to whether or not a printer has been included within a collection or group of shared printers that are made available to users for a fee. In this case, printer's inclusion in the collection or group is the condition to the use of the functionality. In another example, certain printer functionality may be enabled or disabled according to whether or not the user that is requesting access to the printer is a member of a social network or other affiliation. In this case, the user's membership in the group or affiliation is the condition to the use of the functionality. In another example, certain printer functionality may be enabled or disabled according to whether or not the user that is requesting access to the printer has committed himself or herself to printing a defined number of advertisements at the printer. In this case, the user's commitment to print advertisements is the condition to the use of the functionality. In another example, the actual printing of the advertisements at the printer is the condition to the use of the functionality.

Following receipt of the fulfillment data 118, the printer functionality enablement and disablement service 110 determines whether the enablement data 116 is consistent with the fulfillment data 118. If the service 110 determines that the enablement data 116 is inconsistent with the fulfillment data 118, the service 110 causes the sending of change instruction 120 to the printer 106 over the network 108. For example, if the enablement data 116 indicates functionality is in a first 122 "enabled" state, and the fulfillment data 118 indicates that the condition precedent for enablement of the functionality (e.g. payment of a fee) has not been fulfilled, the service 110 determines that the enablement data 116 and fulfillment data 118 are inconsistent and causes the change instruction 120 to be sent to the printer 106. The change instruction 120 is an instruction, message, command or other data that, when received by the printer 106, causes a change in the first enablement state 122 of the functionality to a second enablement state 124 (in this example, a "disabled state") that is consistent with the fulfillment data 118.

In an example, the receipt of the enablement data 116 is pursuant to a first-time connection between the printer 106 and the computer system 102, with marking agent supply or other printer functionality in a disabled state. In this example, responsive to receipt of condition fulfillment data 118 indicating payment of a license fee, subscription fee, lease fee, or other fee, the computer system 102 sends a change instruction 120 to the printer 106 to enable the printer functionality.

The functions and operations described with respect to functionality enablement service 110 and computer system 102 may be implemented as a non-transitory computer-readable storage medium containing instructions executed by a processor (e.g., processor 112) and stored in a memory (e.g., memory 114). In a given implementation, processor 112 may represent multiple processors, and memory 114 may represent multiple memories. Processor 112 represents generally any instruction execution system, such as a computer/processor based system or an ASIC (Application Specific Integrated Circuit), a computer, or other system that can fetch or obtain instructions or logic stored in memory 114 and execute the instructions or logic contained therein. Memory 114 represents generally any memory configured to store program instructions and other data.

Figure 2:
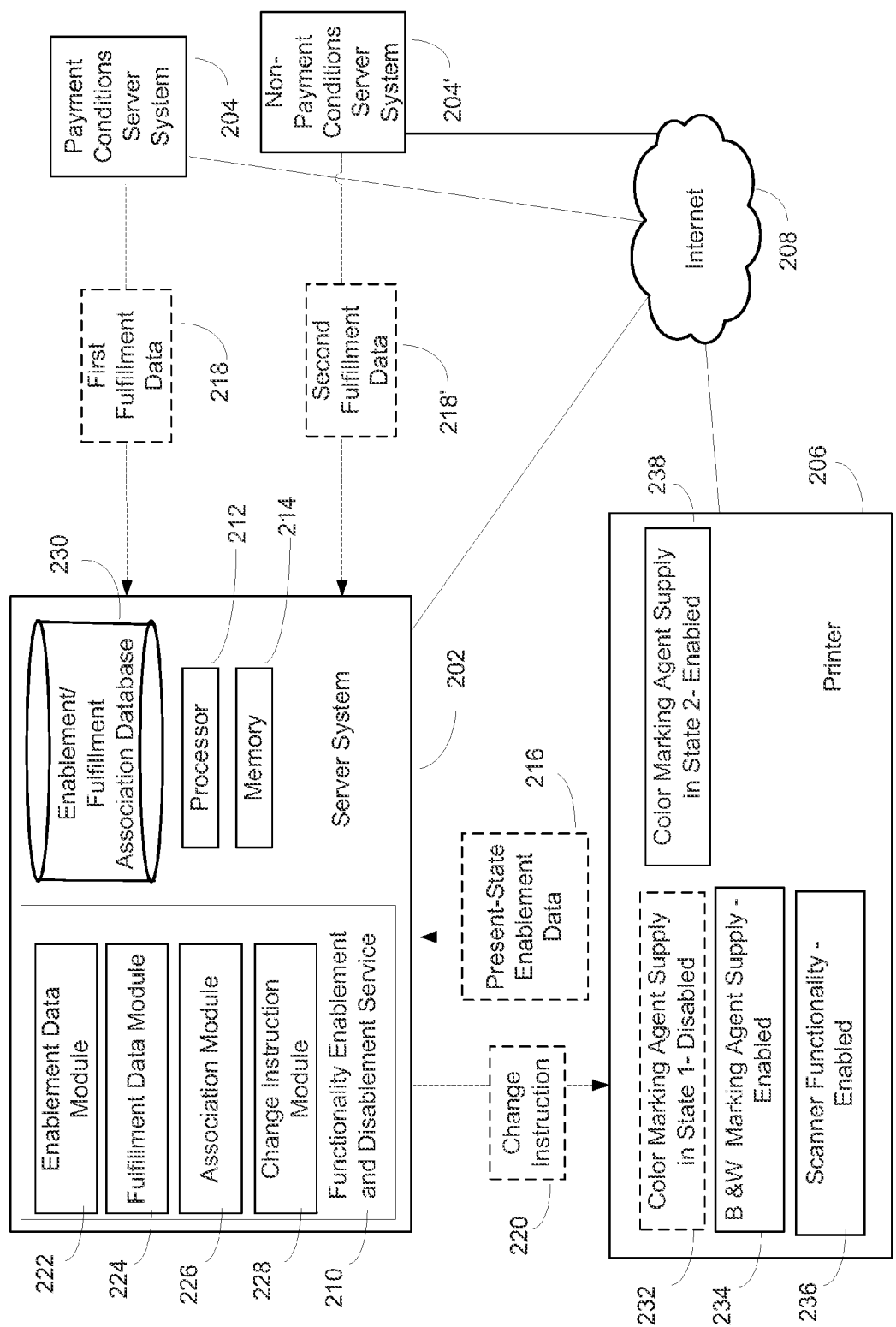
FIG. 2 is a block diagram illustrating a system according to various embodiments.

FIG. 2 is a block diagram illustrating a system according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 2 shows a server system 202 electronically connected to a payment server system 204, and a printer 206 via an internet 208. Server system 202 represents generally any computing device or group of computing devices configured to send and receive network requests, send and receive content, and otherwise communicate with, payment server system 204 and printer 206. In examples, server system 202 may be or include a server, desktop computer, notebook computer, mobile device, tablet computer, and/or any other computing device.

Payment conditions server system 204 and non-payment conditions server system 204' each represent generally a computing device, or group of computing devices, configured to send and receive network requests, send content to, and otherwise communicate with, server system 202.

Printer 206 represents generally a computing device that is operable to produce a printed print job or printed content, and additionally operable to send network requests, print jobs and other content to, receive network requests, print jobs, and other content from, and otherwise communicate with server system 202 over internet 208.

Internet 208 represents generally hardware components and computers interconnected by communications channels that allow sharing of resources and information over an internet or intranet network, or over a combination of both. Internet 208 may include a cable, wireless, fiber optic, or remote connection via a telecommunication link, an infrared link, a radio frequency link, or some combination of these, or any other connectors or systems that provide electronic communication. Internet 208 may also include intermediate proxies, routers, switches, load balancers, and the like. The paths followed by internet 208 between server system 202, payment server system 204, non-payment conditions server system 204', and printer 206 as depicted in FIG. 2 represent the logical communication paths between these devices, not necessarily the physical paths between the devices.

Server system 202 is shown to include a functionality enablement and disablement service 210, an enablement/fulfillment association database 230, a processor 212, and a memory 214. Functionality enablement and disablement service 210 represents generally any combination of hardware and programming configured to provide for enablement and disablement of printer functionality based upon fulfillment or lack of fulfillment of a condition precedent to operation of the printer functionality. The service 210 includes an enablement data module 222, a fulfillment data module 224, an association module 226, and a change instruction module 228. Enablement/fulfillment association database 230 represents generally a database, registry, lookup table or list that associates enablement data and fulfillment data. Processor 212 represents generally any instruction execution system, such as a computer/processor based system or an ASIC (Application Specific Integrated Circuit), a computer, or other system that can fetch or obtain instructions or logic stored in memory 214 and execute the instructions or logic contained therein. Memory 214 represents generally any memory configured to store program instructions and other data.

In the example of FIG. 2, enablement data module 222 included within functionality enablement and disablement service 210 and executing at server system 202 receives from a network-connected printer 206, present-state enablement data 216 indicative of a then-present enablement state of functionality 222 at the printer 206. In this example, the functionality for which the received enablement data is applicable is use of a color marking agent supply 232, use of a black and white marking agent supply 234, and use of a scanner 236. The enablement data 216 indicates the first color marking agent supply 232 is disabled, the black and white marking agent supply 234 is enabled, and the scanner 236 is enabled.

The fulfillment data module 224 receives from the payment conditions server system 204 first fulfillment data 218 indicative of a fulfillment state of a payment condition to the enablement of the first color marking agent supply functionality at the printer. In this example, a condition to the enablement of the first color marking agent supply functionality 232 at the printer 206 includes up to date payment of license fees for the color marking agent cartridges. The fulfillment data module 224 receives from the non-payment conditions server system 204' second fulfillment data 218' indicative of fulfillment states of non-payment conditions to the enablement of the black and white marking agent supply 234 and scanner 236 functionality at the printer 206. In an example, payment conditions server system 204 and non-payment conditions server system 204' are part of a server system or server systems separate and distinct from the server system 202 that hosts the functionality enablement and disablement service 210.

FIG. 3, in view of FIG. 2, depicts an example of an enablement/fulfillment association database 230 according to various embodiments. In this example, the enablement/fulfillment association database 230 holds a set of associations to certain printer functionality 302, the associations including the current enablement state 304 of the functionality as indicated by functionality data, the condition 306 to enablement of the functionality, the fulfillment status 308 as indicated by the fulfillment data, the correct enablement status 310 in view of the fulfillment status, and whether a change in status is needed 312.

In the example of FIG. 3 in view of FIG. 2, the condition 314 to the enablement of the first color marking agent supply functionality 232 includes up to date payment of license fees for the color cartridges. First fulfillment data 218 (FIG. 2) reveals that the fulfillment status for this condition is "met" 316. The association database 230 contains additional information indicative that the correct enablement status for the functionality in view of the non-fulfillment of the condition is "enabled" 318. In light of the incongruity of the current enablement state of "disabled" 320 and the "correct enablement status" of "enabled" 318 for the color marking agent cartridges, the association database 230 stores a determination that a change in functionally state is needed 322.

Continuing at FIG. 3 in view of FIG. 2, a condition to the enablement of the black and white marking agent supply functionality 234 and the scanner functionality 236 of the printer 206 is user subscription to a service that provides access to the printer 206 as part of the service 326. Second fulfillment data 218' (FIG. 2) reveals that the fulfillment status for this condition is "met" 328. The association database 230 contains additional information indicating that the correct enablement status for the black and white marking agent and scanner functionality in view of the fulfillment of the condition is "enabled" 330. In light of the congruity of the current enablement state of enabled 332 and the correct enablement status of "enabled" 330, the database stores a determination that a change in functionally state is not necessary 334.

Returning to FIG. 2, change instruction module 228, utilizing information stored at the association database 230, determines that enablement data 216 is inconsistent with the first fulfillment data 218 and the second fulfillment data 218'. Given the determination that the enablement data 216 is inconsistent with the fulfillment data 218, the change instruction module 228 causes the sending of a change instruction 220 to the printer 206 over the network 208. In this example, the change instruction 220 is an instruction, message, command or other data that, when received by the printer 206, causes a change in the color marking agent supply 232 from a "disabled" state to an "enabled" state 238 that is consistent with the fulfillment data 218.

The functions and operations described with respect to functionality enablement service 210 and server system 202 may be implemented as a non-transitory computer-readable storage medium containing instructions executed by a processor (e.g., processor 212) and stored in a memory (e.g., memory 214). In a given implementation, processor 212 may represent multiple processors, and memory 214 may represent multiple memories. Processor 212 represents generally any instruction execution system, such as a computer/processor based system or an ASIC (Application Specific Integrated Circuit), a computer, or other system that can fetch or obtain instructions or logic stored in memory 214 and execute the instructions or logic contained therein. Memory 214 represents generally any memory configured to store program instructions and other data.

Figure 4:
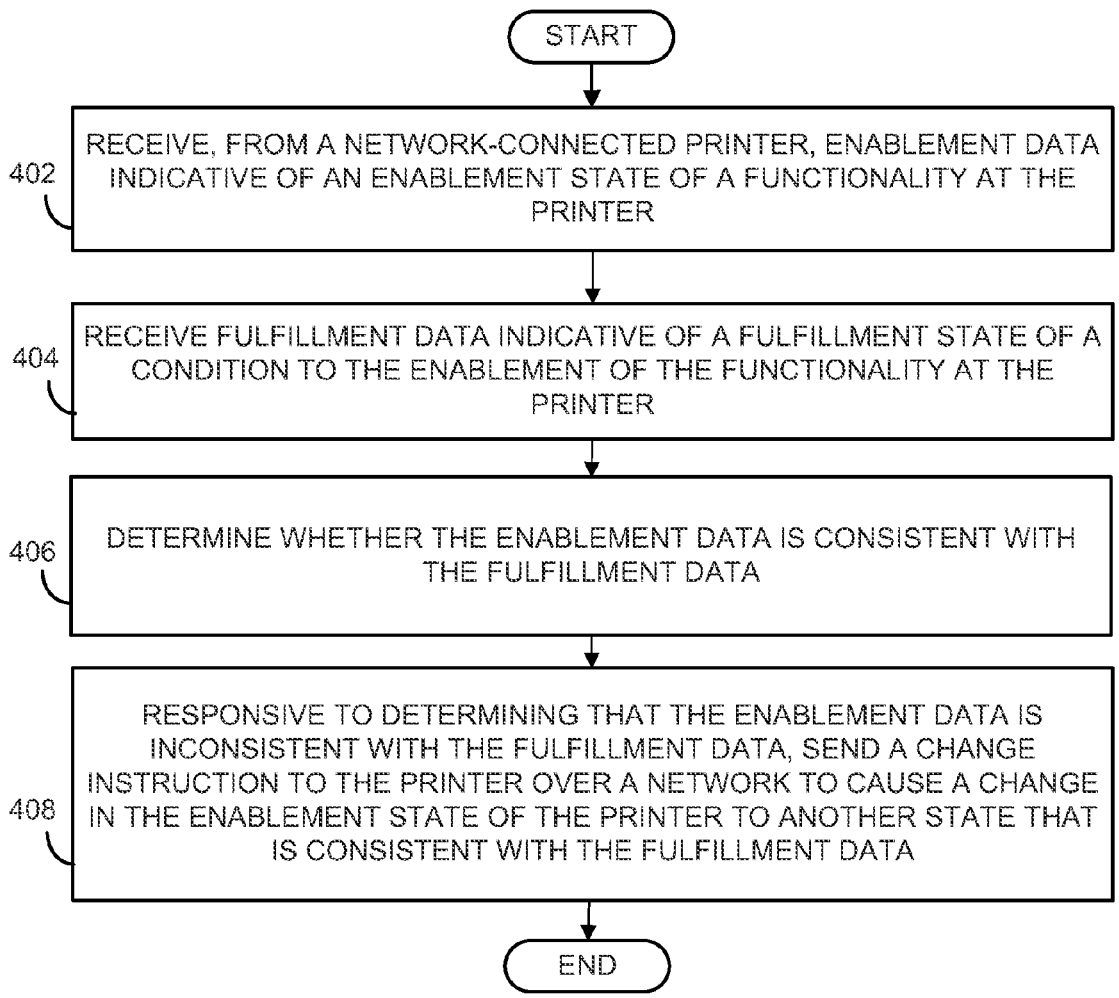
FIG. 4 is a flow diagram depicting steps taken to implement various embodiments.

FIG. 4 is a flow diagram of operation in a system according to various embodiments. In discussing FIG. 4, reference may be made to the diagram of FIG. 2 to provide contextual examples. Implementation, however, is not limited to those examples. Starting with FIG. 4, enablement data indicative of an enablement state of a functionality at a network-connected printer is received from the printer (block 402). Referring back to FIG. 2, enablement data module 222 may be responsible for implementing block 402.

Continuing with FIG. 4, fulfillment data indicative of a fulfillment state of a condition to the enablement of the functionality at the printer is received (block 404). Referring back to FIG. 2, fulfillment data module 224 may be responsible for implementing block 404.

Continuing with FIG. 4, it is determined whether the enablement data is consistent with the fulfillment data (block 406). Referring back to FIG. 2, association module 226 may be responsible for implementing block 406.

Continuing with FIG. 4, responsive to determining that the enablement data is inconsistent with the fulfillment data, a change instruction is sent to the printer over a network to cause a change in the enablement state to another state that is consistent with the fulfillment data (block 408). Referring back to FIG. 2, change instruction module 228 may be responsible for implementing block 408.

Various modifications may be made to the disclosed embodiments and implementations without departing from their scope. Therefore, the illustrations and examples herein should be construed in an illustrative, and not a restrictive, sense.

What is claimed is:

1. A non-transitory computer-readable storage medium comprising instructions, the instructions when executed by a processor causing the processor to:
   receive, from a network-connected printer, enablement data indicative of whether different functionalities of the printer are enabled or disabled;
   receive fulfillment data indicative of a fulfillment state of a condition that leads to the enablement or disablement of at least one of the different functionalities of the printer;
   comparing the enablement data with the fulfillment data to determine whether the enablement data is consistent with the fulfillment data; and
   responsive to determining that the enablement data is inconsistent with the fulfillment data, send a change instruction to the printer over a network to cause a change in the enablement state to another state that is consistent with the fulfillment data.

2. The medium of claim 1,
   wherein the enablement data is first enablement data and the fulfillment data is first fulfillment data;
   wherein determining whether the first enablement data is consistent with the first fulfillment data includes accessing a database associating enablement data with fulfillment data, and
   wherein the another state is determined according to the database.

3. The medium of claim 1, wherein the change in the enablement state is from an enabled state to a disabled state.

4. The medium of claim 1, wherein one of the different functionalities is use of a marking agent supply within the printer.

5. The medium of claim 4, wherein the marking agent supply is a first marking agent supply, and a second marking agent supply remains usable in the printer.

6. The medium of claim 1, wherein one of the different functionalities is use of a printing component within the printer.

7. The medium of claim 1, wherein one of the different functionalities is use of a color marking agent supply.

8. The medium of claim 1, wherein one of the different functionalities is use of a color photo marking agent supply.

9. The medium of claim 1, wherein the condition includes payment of a fee or charge associated with use of the at least one of the different functionalities.

10. The medium of claim 9, wherein receipt of the enablement data is pursuant to a first-time connection with the printer, with the printer functionality in a disabled state, and wherein, responsive to receipt of the fulfillment data indicating payment of the fee or charge, the processor sends the change instruction to the printer to enable the at least one of the different functionalities.

11. The medium of claim 1, wherein the fulfillment data is received from a separate computer system.

12. The medium of claim 1, wherein the condition indicates a type of print job that is received at the printer.

13. The medium of claim 1 in which the enablement data indicates a partially enabled state, a partially disabled state, or combinations thereof.

14. A system, comprising a memory and a processor to execute instructions stored in the memory to implement modules, the modules comprising:
- an enablement data module, configured to receive from a network-connected printer, a first enablement data indicative of whether different functionalities of the printer is enabled or disabled;
- a fulfillment data module, configured to receive a first fulfillment data indicative of state of fulfillment of a condition applicable to lead to the enablement or disablement of at least one of the different functionalities of the printer;
- an association module, configured to access a database associating enablement data with fulfillment data to compare the enablement data with the fulfillment data to determine whether the first enablement data is consistent with the first fulfillment data; and
- a change instruction module, configured to, responsive to determining that the first enablement data is inconsistent with the first fulfillment data, send a change instruction to the printer over a network to cause the printer to change state of the enablement of the at least one of the different functionalities to another state that is consistent with the first fulfillment data according to the database.

15. The system of claim 14, wherein state of enablement of the at least one of the different functionalities is changed to a disabled state.

16. The system of claim 14, wherein one of the different functionalities is usability of a hardware component with the printer.

17. The system of claim 14, wherein one of the different functionalities is usability of a marking agent supply within the printer.

18. The system of claim 17, wherein the marking agent supply is a first marking agent supply, and a second marking agent supply remains usable in the printer.

19. The system of claim 14, wherein one of the different functionalities is usability of a printing component within the printer.

20. A non-transitory computer-readable storage medium containing instructions, the instructions when executed by a processor causing the processor to:
- receive at a computer system, from a network-connected printer, a first enablement data, indicative of an enabled state or a disabled state of use of a marking agent supply at the printer;
- receive a first fulfillment data, from a payment conditions system, indicative of a fulfillment state of payment of a fee or charge as a condition precedent to enablement of the marking agent supply;
- receive a second fulfillment data, from a non-payment conditions system, indicative of a fulfillment state of non-payment conditions to the enablement of the marking agent supply;
- access a database associating enablement data with fulfillment data to determine whether the first enablement data is consistent with the first fulfillment data and the second fulfillment data, in which the database indicates:
  - a printer functionality;
  - a current enablement state of the functionality;
  - a condition to enablement of the functionality;
  - a fulfillment status of the condition;
  - a correct enablement status in view of the fulfillment status; and
  - whether a change in status is applicable; and
- responsive to determining that the first enablement data is inconsistent with the first fulfillment data and the second fulfillment data, send a change instruction to the printer over a network to cause a change in the enablement to another state that is consistent with the first fulfillment data and the second fulfillment data according to the database.

* * * * *